US010404027B2

(12) United States Patent
Porter

(10) Patent No.: US 10,404,027 B2
(45) Date of Patent: Sep. 3, 2019

(54) PALLET FOR TRANSPORTING ELECTRICAL CONNECTORS

(71) Applicant: THE BOEING COMPANY, Chicago, IL (US)

(72) Inventor: John R. Porter, Edgewood, WA (US)

(73) Assignee: THE BOEING COMPANY, Chicago, IL (US)

( * ) Notice: Subject to any disclaimer, the term of this patent is extended or adjusted under 35 U.S.C. 154(b) by 257 days.

(21) Appl. No.: 15/372,656

(22) Filed: Dec. 8, 2016

(65) Prior Publication Data

US 2018/0162591 A1 Jun. 14, 2018

(51) Int. Cl.
*H01R 43/26* (2006.01)
*B65D 19/44* (2006.01)
*B25B 1/06* (2006.01)
*B65G 17/32* (2006.01)
*B25B 1/24* (2006.01)
(Continued)

(52) U.S. Cl.
CPC ............... *H01R 43/26* (2013.01); *B25B 1/02* (2013.01); *B25B 1/06* (2013.01); *B25B 1/24* (2013.01); *B25B 1/2415* (2013.01); *B65D 19/44* (2013.01); *B65G 17/323* (2013.01); *B25B 5/02* (2013.01); *B25B 5/085* (2013.01); *B25B 5/166* (2013.01); *B41F 17/001* (2013.01);
(Continued)

(58) Field of Classification Search
CPC ............... H01R 43/26; H01R 2201/26; Y10T 29/53261; B65D 19/44; B65D 17/323; B65D 2519/00815; B25B 1/02; B25B 1/06; B25B 1/24; B25B 1/2415; B25B 5/02; B25B 5/085; B25B 5/166
See application file for complete search history.

(56) References Cited

U.S. PATENT DOCUMENTS

| 6,705,217 B1 * | 3/2004 | Godsey ................. B41F 17/001 101/35 |
| 9,067,306 B1 * | 6/2015 | Lee ........................... B25B 1/24 |
| 2006/0065870 A1 | 3/2006 | Mori et al. |

FOREIGN PATENT DOCUMENTS

| CN | 103280687 A | 9/2013 |
| EP | 1257020 A2 | 11/2002 |

(Continued)

OTHER PUBLICATIONS

European Patent Office Extended Search Report for Application No. 17205733.3-1201 dated Mar. 16, 2018.
(Continued)

*Primary Examiner* — A. Dexter Tugbang
(74) *Attorney, Agent, or Firm* — Patterson + Sheridan, LLP

(57) ABSTRACT

A pallet, manufacturing system, and method for transporting and assembling different electrical connectors are provided. The pallet includes first and second jaw assemblies spaced apart from a connector support. The jaw assemblies include jaw plates with gripping edges that form a contoured opening therebetween. As the jaw assemblies move toward one another, dimensions of the contoured opening decrease such that the gripping edges contact and grip an electrical connector placed in the contoured opening. The jaw assemblies are connected to each other by a synchronization device that synchronizes motion of the jaw assemblies and centers the jaw assemblies about an alignment point on the pallet. The pallet accommodates a number of different sizes and/or types of electrical connectors.

20 Claims, 11 Drawing Sheets

(51) Int. Cl.
  *B25B 1/02* (2006.01)
  *B41F 17/00* (2006.01)
  *B25B 5/02* (2006.01)
  *B25B 5/08* (2006.01)
  *B25B 5/16* (2006.01)

(52) U.S. Cl.
  CPC .............. *B65D 2519/00815* (2013.01); *H01R 2201/26* (2013.01); *Y10T 29/53261* (2015.01)

(56) References Cited

FOREIGN PATENT DOCUMENTS

JP         3019706 B2      3/2000
JP      2013131390 A  *    7/2013

OTHER PUBLICATIONS

U.S. Appl. No. 14/826,291 entitled "Automated Systems and Methods for Manufacturing Electrical Connectors Using Universal Connector Support Assemblies", ID 15/0775-US-NP, pp. 1-46.

* cited by examiner

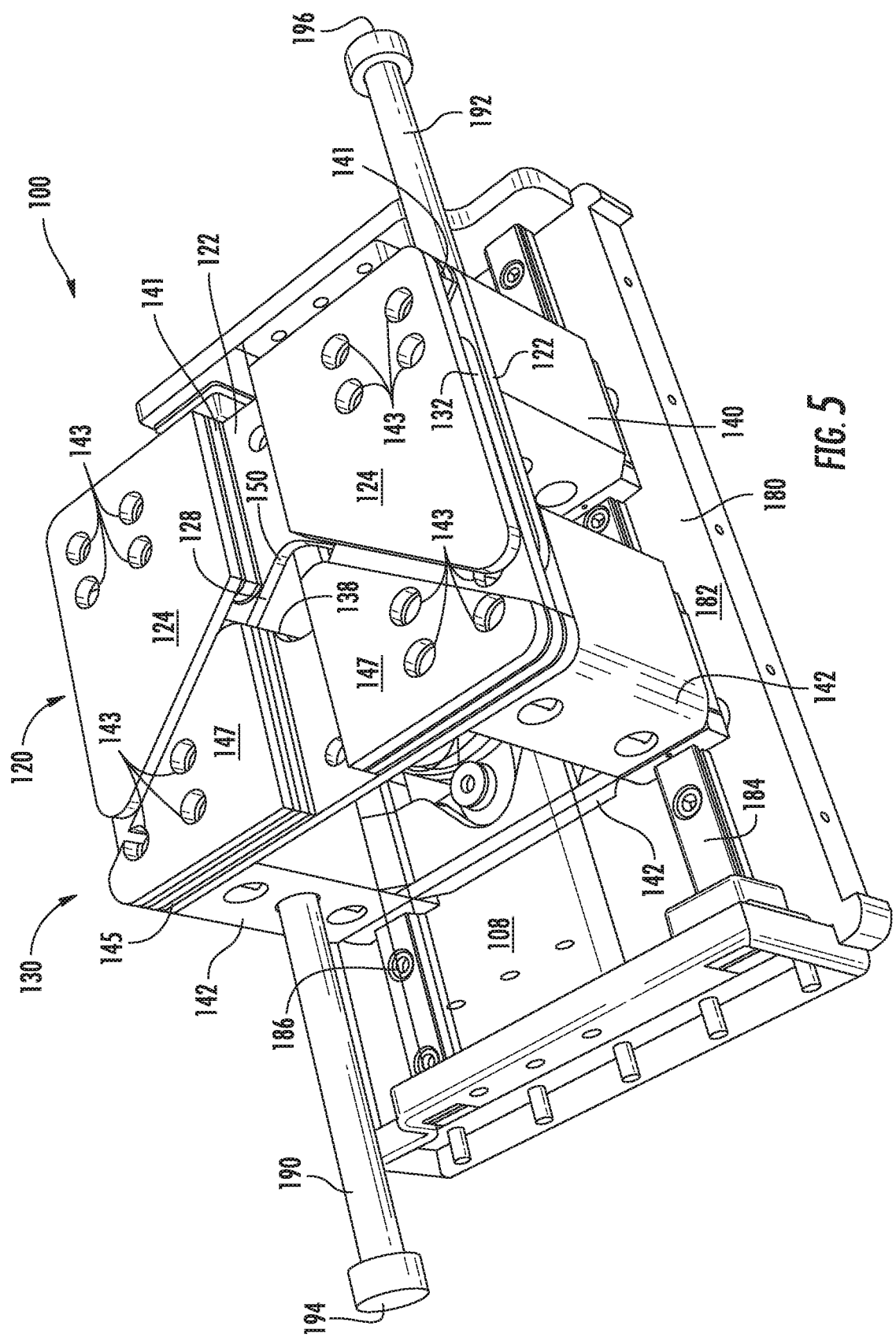

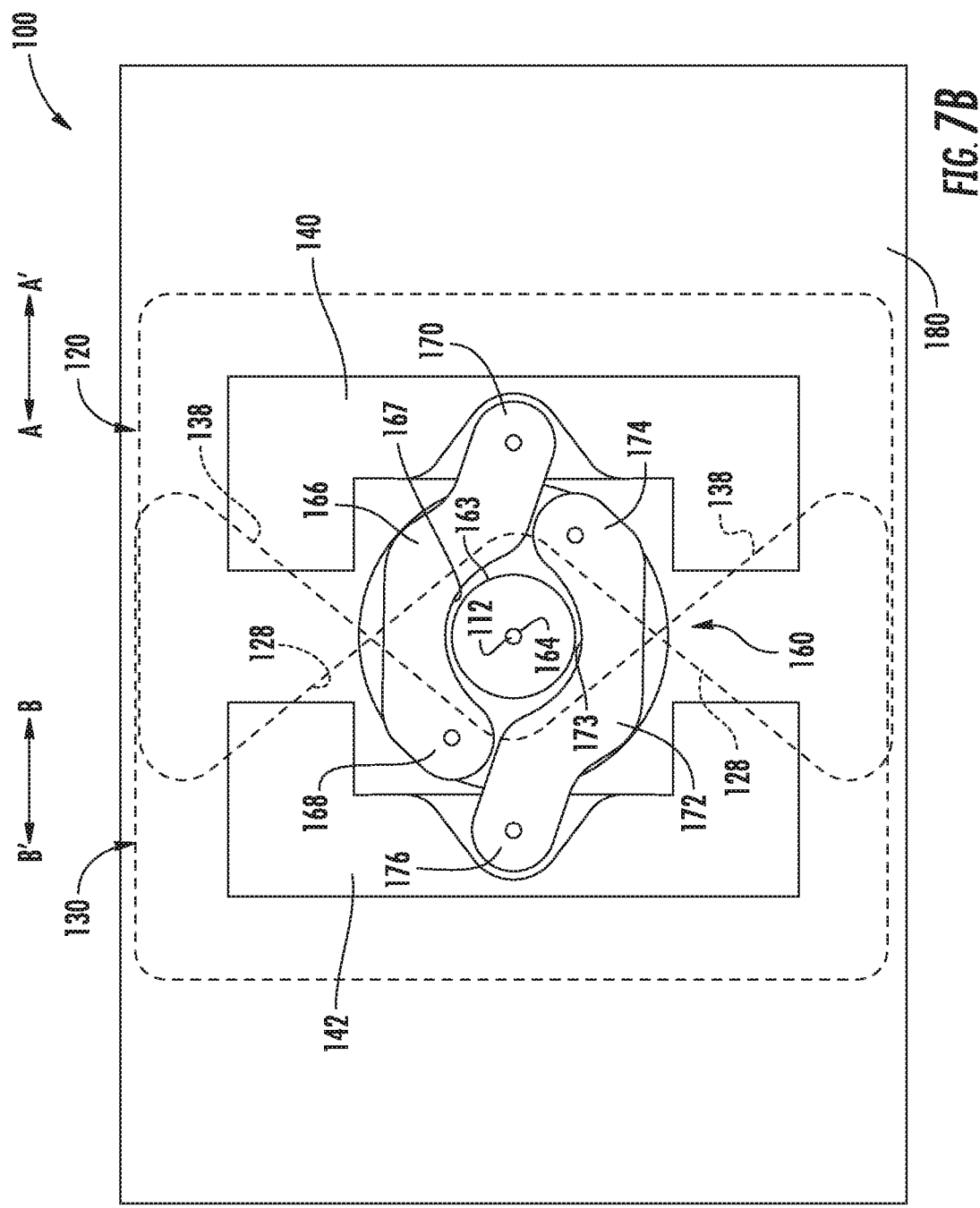

PALLET FOR TRANSPORTING ELECTRICAL CONNECTORS

BACKGROUND

Electrical connectors are used to securely connect electrical wires. For example, a wire bundle from a particular avionics module onboard an aircraft may be connected to a wiring harness through a circular electrical connector. The wire bundle is connected to a first half of the circular electrical connector and the wiring harness is connected to the second half of the circular electrical connector. The two halves of the circular electrical connector include sockets arranged in a particular manner such that the two halves of the electrical connector and the sockets are connectable in a singular manner. As a result, when the two halves of the electrical connector are connected, the respective wires of the wire bundle are electrically connected to particular respective ones of the wires of the wiring harness. In certain instances, not all sockets of an electrical connector are used. In such instances, the unused sockets are typically plugged, which prevents moisture, dirt, or other debris from entering the connector. Machines, such as robots, can quickly and accurately plug sockets of electrical connectors, but the robots typically require the connectors to be positioned and oriented relatively accurately to do so.

Electrical connectors may be provided to the robots on pallets that carry respective electrical connectors to the robots on a conveyor system. The pallets include cutouts or other keying features that position and orient electrical connectors thereon. Due to the different sizes and configurations of electrical connectors, the pallets are specific to particular ones of the electrical connectors. Thus, for an assembly system to accommodate five different electrical connectors, the assembly system would need 5 different types of pallets, for example.

SUMMARY

According to one aspect, a pallet for transporting electrical connectors is provided. The pallet comprises a connector support that includes a first end and a second opposed end. The connector support includes a support surface between the first end and the second end. The connector support defines a longitudinal axis between the first end, the second end, and an alignment point between the first end and the second end. The pallet also comprises a first jaw assembly arranged over the support surface and bi-directionally movable along the longitudinal axis between the first end and the alignment point. The first jaw assembly comprises a first jaw plate and a second jaw plate arranged over the support surface of the connector support. The first jaw plate and the second jaw plate are in a parallel spaced-apart relationship with respect to each other so as to form a gap. The first and second jaw plates define a first gripping edge. The pallet also comprises a second jaw assembly arranged over the support surface and bi-directionally movable along the longitudinal axis between the second end and the alignment point. The second jaw assembly comprises a third jaw plate arranged over the support surface of the connector support and in parallel relation relative to the first and second jaw plates. The third jaw plate defines a second gripping edge. The third jaw plate is disposed on a plane of the gap so that the third jaw plate is inserted into the gap when the first jaw assembly and the second jaw assembly are moved toward each other into a closed position. The first gripping edge and the second gripping edge are in an opposing facing relationship with the alignment point disposed therebetween. The first gripping edge and the second gripping edge form a contoured opening centered on the alignment point. The contoured opening becomes increasingly smaller in a first dimension along the longitudinal axis and a second dimension transverse to the longitudinal axis as the first jaw assembly and the second jaw assembly are moved into the closed position. The pallet also comprises a synchronization device connected to the first jaw assembly and the second jaw assembly. The synchronization device is operable to synchronize motion of the first jaw assembly and the second jaw assembly from the respective first and second ends toward the alignment point.

According to one aspect, a manufacturing system for electrical connectors with different sizes is provided. The manufacturing system comprises a plurality of pallets. The respective pallets comprise a connector support that includes a first end and a second opposed end. The connector support includes a support surface between the first end and the second end. The connector support defines a longitudinal axis between the first end, the second end, and an alignment point between the first end and the second end. The respective pallets also comprise a first jaw assembly arranged over the support surface and bi-directionally movable along the longitudinal axis between the first end and the alignment point. The first jaw assembly comprises a first jaw plate and a second jaw plate arranged over the support surface of the connector support. The first jaw plate and the second jaw plate are in a parallel spaced-apart relationship with respect to each other so as to form a gap. The first and second jaw plates define a first gripping edge. The respective pallets also comprise a second jaw assembly arranged over the support surface and bi-directionally movable along the longitudinal axis between the second end and the alignment point. The second jaw assembly comprising a third jaw plate arranged over the support surface of the connector support and in parallel relation relative to the first and second jaw plates. The third jaw plate defines a second gripping edge. The third jaw plate is disposed on a plane of the gap so that the third jaw plate is inserted into the gap when the first jaw assembly and the second jaw assembly are moved toward each other into a closed position. The first gripping edge and the second gripping edge are in an opposing facing relationship with the alignment point disposed therebetween. The first gripping edge and the second gripping edge form a contoured opening centered on the alignment point. The contoured opening becomes increasingly smaller in a first dimension along the longitudinal axis and a second dimension transverse to the longitudinal axis as the first jaw assembly and the second jaw assembly are moved into the closed position. The respective pallets also comprise a synchronization device connected to the first jaw assembly and the second jaw assembly. The synchronization device is operable to synchronize motion of the first jaw assembly and the second jaw assembly from the respective first and second ends toward the alignment point. The manufacturing system also comprises at least one robot operable to plug connector sockets of electrical connectors with plugs. The manufacturing system also comprises a conveyor operable to transport respective ones of the plurality of pallets to the at least one robot.

According to one aspect, a method of plugging electrical comprises providing a pallet, wherein the pallet comprises a connector support that includes a first end and a second opposed end, wherein the connector support includes a support surface between the first end and the second end. The connector support defines a longitudinal axis between the first end, the second end, and an alignment point between the first end and the second end. The pallet also comprises a first jaw assembly arranged over the support surface and bi-directionally movable along the longitudinal axis between the first end and the alignment point. The first jaw assembly comprises a first jaw plate and a second jaw plate arranged over the support surface of the connector support. The first jaw plate and the second jaw plate are in a parallel spaced-apart relationship with respect to each other so as to form a gap. The first and second jaw plates define a first gripping edge. The pallet also comprises a second jaw assembly arranged over the support surface and bi-directionally movable along the longitudinal axis between the second end and the alignment point. The second jaw assembly comprises a third jaw plate arranged over the support surface of the connector support and in parallel relation relative to the first and second jaw plates. The third jaw plate defines a second gripping edge. The third jaw plate is disposed on a plane of the gap so that the third jaw plate is inserted into the gap when the first jaw assembly and the second jaw assembly are moved toward each other into a closed position. The first gripping edge and the second gripping edge are in an opposing facing relationship with the alignment point disposed therebetween. The first gripping edge and the second gripping edge form a contoured opening centered on the alignment point. The contoured opening becomes increasingly smaller in a first dimension along the longitudinal axis and a second dimension transverse to the longitudinal axis as the first jaw assembly and the second jaw assembly are moved into the closed position. The pallet also comprises a synchronization device connected to the first jaw assembly and the second jaw assembly. The synchronization device is operable to synchronize motion of the first jaw assembly and the second jaw assembly from the respective first and second ends toward the alignment point. The method further comprises moving the first and second jaw assemblies of the pallet toward the first and second ends, placing a first electrical connector on the support surface of the pallet, and moving the first and second jaw assemblies toward the alignment point such that the first and second gripping edges contact external surfaces of the first electrical connector. The method further comprises transporting the pallet to a robot. The method further comprises operating the robot to plug at least one connector socket on the first electrical connector. The method further comprises transporting the pallet to an unloading station. The method further comprises moving the first and second jaw assemblies of the pallet toward the first and second ends and removing the first electrical connector on the support surface of the pallet. The method further comprises placing a second electrical connector on the support surface of the pallet and moving the first and second jaw assemblies toward the alignment point such that the first and second gripping edges contact external surfaces of the second electrical connector, wherein the external surfaces of the second electrical connector have different external dimension than the first electrical connector. The method further comprises transporting the pallet to the robot. The method further comprises operating the robot to plug at least one connector socket on the second electrical connector. The method further comprises transporting the pallet to the unloading station.

BRIEF DESCRIPTION OF THE SEVERAL VIEWS OF THE DRAWINGS

FIG. 5 is a perspective view of the pallet of FIG. 1, wherein jaw assemblies are illustrated in a closed position;

FIG. 7B is a top view of the pallet of FIG. 1, wherein aspects of the pallet are removed from the illustration for clarity to show a synchronization device of the pallet, and wherein the synchronization device is shown in a second position with the jaw assemblies in a closed position;

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In various aspects described herein, a pallet includes movable jaws that can grip a wide range of differently-sized electrical connectors thereon to provide proper positioning for subsequent robotic assembly steps. By having a pallet that can accommodate differently-sized electrical connectors, a single pallet or a reduced number of pallets can be used to accommodate a large number of different electrical connector types.

Figure 1:
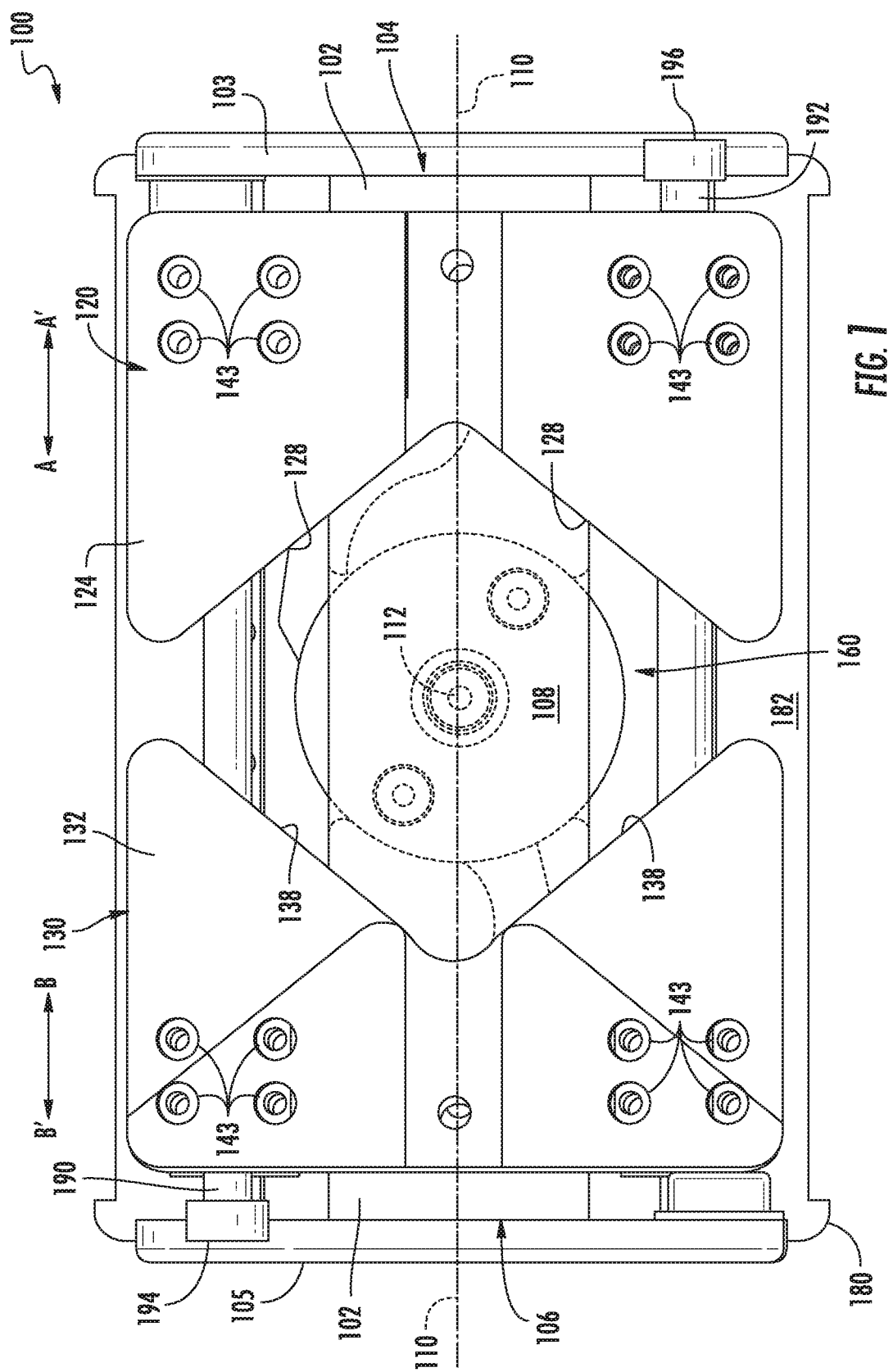
FIG. 1 is a top view of a pallet for transporting electrical connectors according to one aspect, wherein jaw assemblies are illustrated in an open position.
Figure 2:
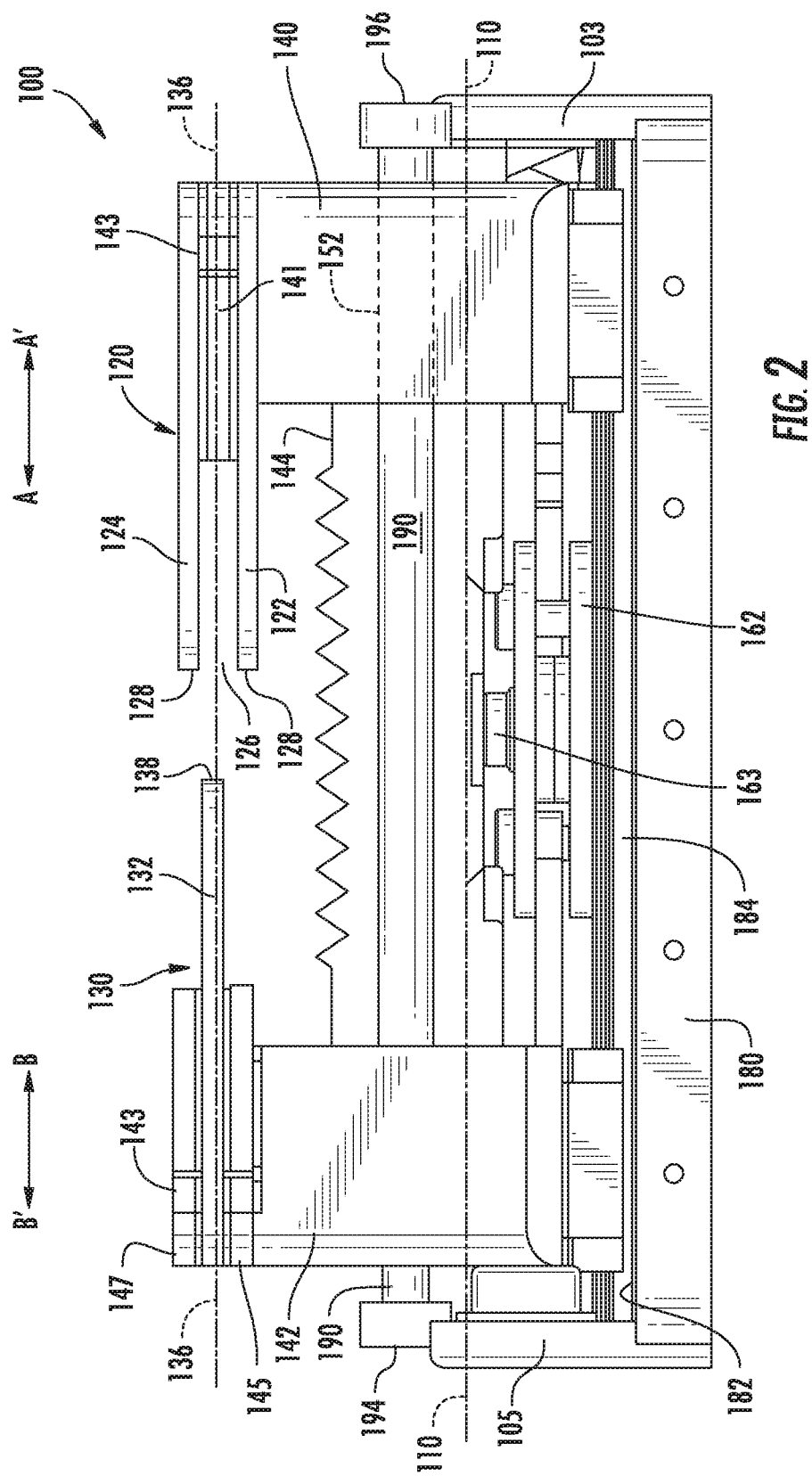
FIG. 2 is a side view of the pallet of FIG. 1.
Figure 3:
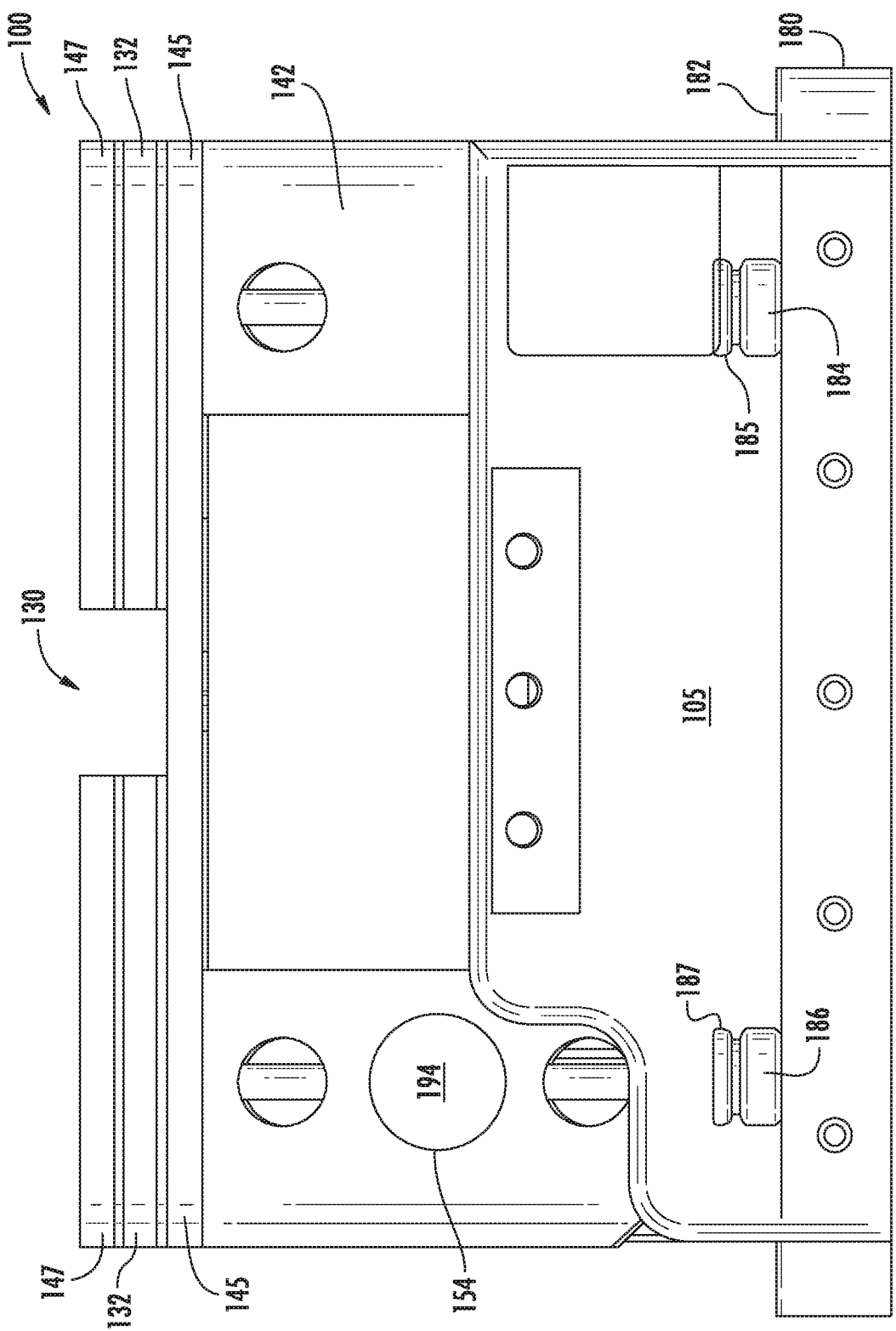
FIG. 3 is an end view of the pallet of FIG. 1.

FIGS. 1-5 illustrate various views of a pallet 100 for transporting electrical connectors around a manufacturing system (e.g., manufacturing system 300 illustrated in FIG. 8) that can, for example, insert plugs into unused sockets of the electrical connectors. The pallet 100 includes a pallet base 180. The pallet base 180 includes a first surface 182 and members 103 and 105 extending from the first surface 182 at opposite ends of the pallet base 180. Referring primarily to FIGS. 2 and 3, a connector support 102 is disposed over the pallet base 180 in a spaced apart manner. The connector support 102 is connected to the members 103 and 105 at a first end 104 and a second end 106, respectively. The connector support 102 includes a support surface 108 between the first end 104 and the second end 106. The connector support 102 defines a longitudinal axis 110 between the first end 104 and the second end 106. The support surface 108 of the connector support 102 also defines an alignment point 112 between the first end 104 and the second end 106 over which an electrical connector is to be centered. Typically, the alignment point 112 is equidistant between the first end 104 and the second end 106 of the connector support 102. However, the alignment point 112 could be closer to the first end 104 or the second end 106 in other aspects.

The pallet 100 includes a first jaw assembly 120 arranged over the support surface 108 of the connector support 102. The first jaw assembly 120 is bi-directionally movable along the longitudinal axis 110 between the first end 104 and the alignment point 112, meaning the first jaw assembly 120 can move in the direction of arrow A and in the direction of arrow A' along the longitudinal axis 110. The first jaw assembly 120 includes a first jaw plate 122 and a second jaw plate 124 arranged over the support surface 108 of the connector support 102. The first jaw plate 122 and the second jaw plate 124 are in a parallel, spaced apart relationship with respect to each other so as to form a gap 126 there-between. In one aspect, the first jaw assembly 120 includes a spacer plate 141 arranged between the first jaw plate 122 and the second jaw plate 124 to form the gap 126. In at least one aspect, the first jaw assembly 120 includes a first jaw support 140 that supports the first jaw plate 122, the spacer plate 141, and the second jaw plate 124 over the support surface 108 of the connector support 102. The first jaw plate 122, the spacer plate 141, and the second jaw plate 124 may be fastened to the first jaw support 140 via fasteners 143. In at least one aspect, the first jaw support 140, the first jaw plate 122, the spacer plate 141, and the second jaw plate 124 are monolithic. For example, the first jaw support 140, the first jaw plate 122, the spacer plate 141, and the second jaw plate 124 may be formed from a block of material (e.g., a nylon polymer) via a machining process and/or an additive manufacturing process.

The pallet 100 also includes a second jaw assembly 130 arranged over the support surface 108 of the connector support 102. The second jaw assembly 130 is bi-directionally movable along the longitudinal axis 110 between the second end 106 and the alignment point 112, meaning the second jaw assembly 130 can move in the direction of arrow B and in the direction of arrow B' along the longitudinal axis 110. The second jaw assembly 130 includes a third jaw plate 132 arranged over the support surface 108 of the connector support 102 and in parallel relation relative to the first and second jaw plates 122 and 124. Furthermore, the third jaw plate 132 is disposed on a plane 136 of the gap 126 between the first and second jaw plates 122 and 124 such that, when the first jaw assembly 120 moves in the direction of arrow A and the second jaw assembly 130 moves in the direction of arrow B to a closed position, the third jaw plate 132 is inserted into the gap 126, as illustrated in FIG. 5. In at least one aspect, the second jaw assembly 130 includes a second jaw support 142 that supports the third jaw plate 132 over the support surface 108 of the connector support 102. The third jaw plate 132 is connected to the second jaw support 142 with a spacer plate 145 therebetween. The spacer plate 145 raises the third jaw plate 132 such that the third jaw plate 132 is disposed in the plane 136 of the gap 126 between the first jaw plate 122 and the second jaw plate 124 of the first jaw assembly 120. Stated differently and referring primarily to FIG. 2, the first jaw support 140 and the second jaw support 142 may have equal dimensions. As such, if the first jaw plate 122 and the third jaw plate 132 were placed directly on top of the respective first and second jaw supports 140 and 142, the third jaw plate 132 would be disposed in a plane of the first jaw plate 122 such that the first jaw plate 122 and the third jaw plate 132 would interfere with each other when the first jaw assembly 120 and the second jaw assembly 130 are moved in the directions of arrows A and B. The spacer plate 145 raises the third jaw plate 132 out of such interference with the first jaw plate 122. Optionally, the second jaw assembly 130 may include an additional spacer plate 147 arranged on an opposite side of the third jaw plate 132 from the spacer plate 145. In one aspect, the second jaw support 142, the third jaw plate 132, and the spacer plates 145 and 147 are fastened together via fasteners 143. In at least one other aspect, the second jaw support 142, the third jaw plate 132, and the spacer plates 145 and 147 are monolithic. For example, the second jaw support 142, the third jaw plate 132, and the spacer plates 145 and 147, may be formed from a block of material (e.g., a nylon polymer) via a machining process and/or an additive manufacturing process.

The first and second jaw plates 122 and 124 of the first jaw assembly 120 define a first gripping edge 128 and the third jaw plate 132 defines a second gripping edge 138. The first gripping edge 128 and the second gripping edge 138 are in an opposing facing relationship with the alignment point 112 disposed there-between. Stated differently, the first gripping edge 128 and the second gripping edge 138 are disposed on opposite sides of the alignment point 112, and the first and second gripping edges 128 and 138 face the alignment point 112. The first and second gripping edges 128 and 138 contact a periphery of a circular electrical connector such that electrical connector is positioned and retained in alignment with the alignment point 112 (i.e., centered over the alignment point 112) by the first and second gripping edges 128 and 138 when the first jaw assembly 120 and the second jaw assembly 130 are moved in the directions of arrows A and B, respectively.

Figure 6A:
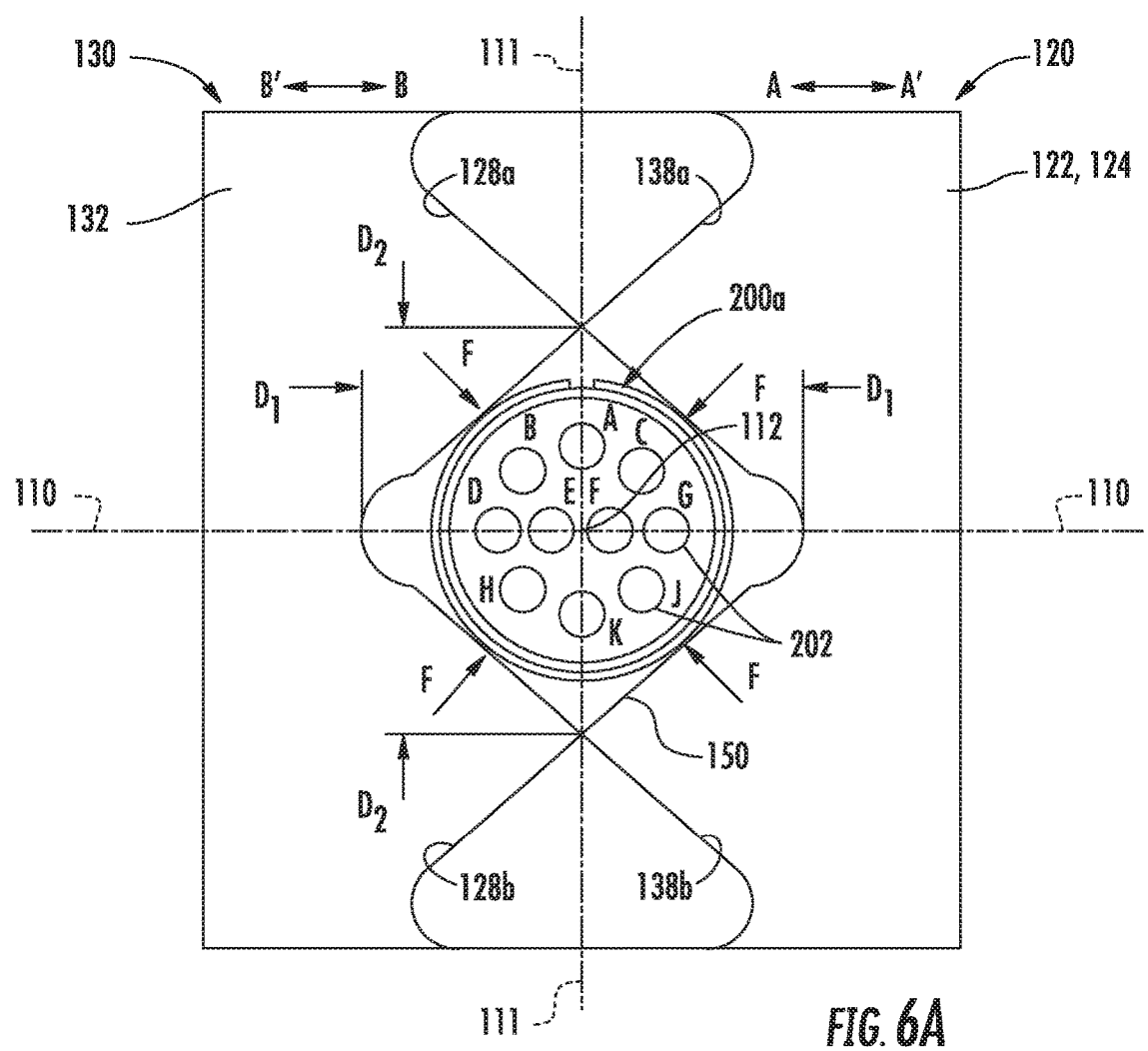
FIG. 6A is a top view of the jaw assemblies of the pallet of FIG. 1 in one closed position about a first electrical connector.
Figure 6B:
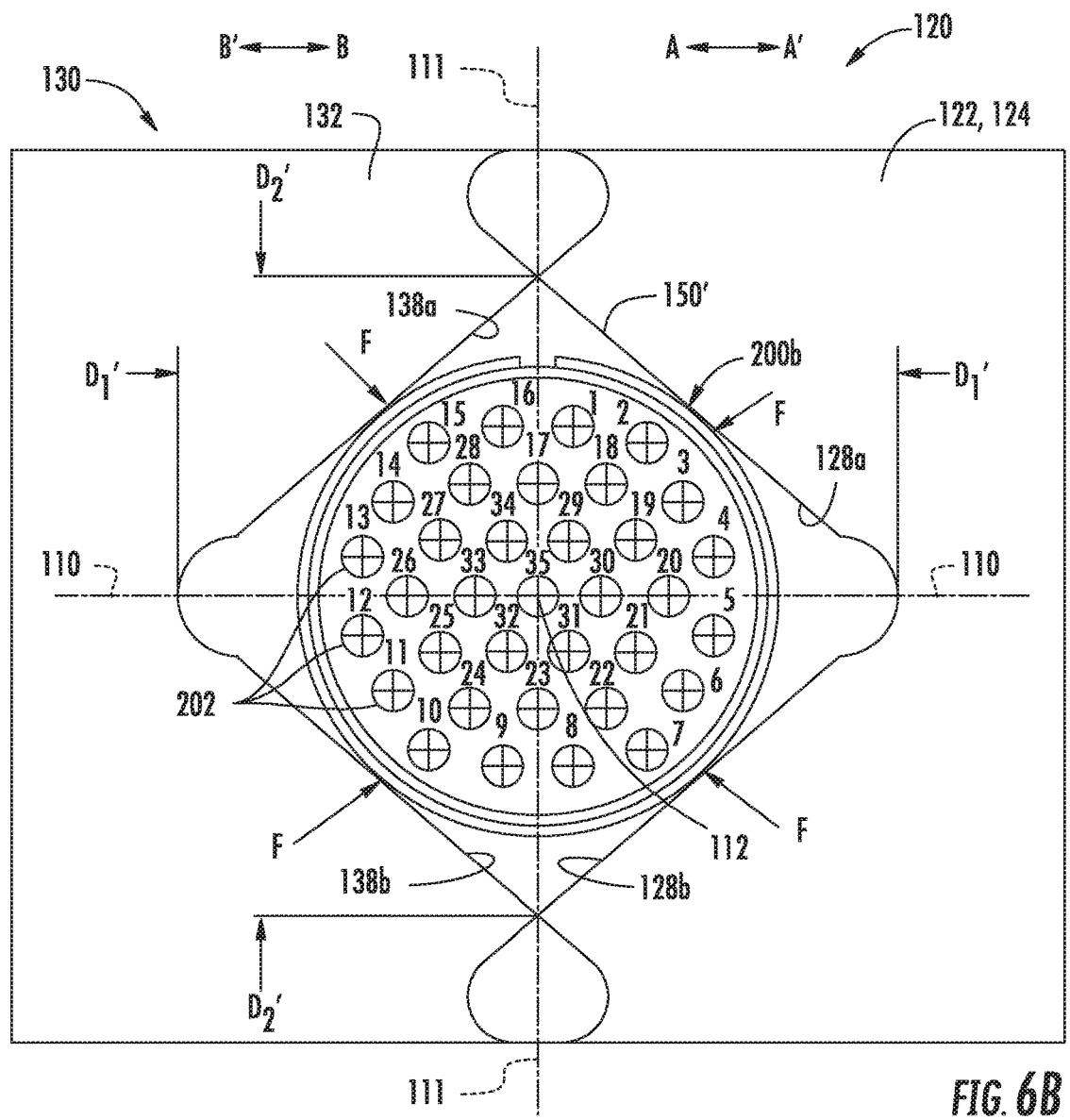
FIG. 6B is a top view of the jaw assemblies of the pallet of FIG. 1 in another closed position about a second electrical connector.

FIGS. 6A and 6B illustrate the jaw plates 122, 124, and 132 of the first and second jaw assemblies 120 and 130 clamping a relatively small circular electrical connector 200a and a relatively large circular electrical connector 200b, respectively. The first and second jaw assemblies 120 and 130 are closer to the fully closed position (shown in FIG. 5) when clamping the relatively small circular electrical connector 200a shown in FIG. 6A than when clamping the relatively large circular electrical connector 200b shown in FIG. 6B. The first gripping edge 128 and the second gripping edge 138 of the first and second jaw assemblies 120 and 130 form a contoured opening 150 centered on the alignment point 112. The contoured opening 150 defines a first dimension $D_1$ along the longitudinal axis 110 and a second dimension $D_2$ and a direction transverse to the longitudinal axis 110 (illustrated by axis 111). The first and second dimensions $D_1$ and $D_2$ become larger as the first and second jaw assemblies 120 and 130 move further away from the alignment point 112 (in the directions of arrows A' and B', respectively). For example, the first dimension $D_1$ and the second dimension $D_2$ of the contoured opening 150 illustrated in FIG. 6A are smaller than the first dimension $D_1'$ and the second dimension $D_2'$ of the contoured opening 150' illustrated in FIG. 6B.

In the event an electrical connector 200 is placed on the support surface 108 of the connector support 102 such that it is not aligned with the alignment point 112, the movement of the jaw assemblies 120 and 130 in the directions of arrows A and B, respectively, toward the fully-closed position (illustrated in FIG. 5) results in a progressively smaller contoured opening 150 (i.e., decreasing first and second dimensions $D_1$ and $D_2$) that urges the electrical connector 200 into alignment with the alignment point 112. If the electrical connector 200 is not aligned with the alignment point 112, then one of the gripping edges 128 or 138 will make contact with the electrical connector 200 before remaining ones of the gripping edges make contact with the electrical connector 200. The particular gripping edge 128 or 138 that makes first contact with the electrical connector 200 will exert a force, indicated by the arrows F, that will urge the electrical connector 200 toward the longitudinal axis 110 and toward the alignment point 1121. For example, with reference to FIG. 6A, consider a scenario in which the electrical connector 200a is placed on the support surface 108 of the connector support 102 slightly above the longitudinal axis 110 and to the left of the alignment point 112 (wherein the terms "above" and "left" are used with reference to the view in the Figure). In such a scenario, as the jaw assemblies 120 and 130 move in the directions of arrows A and B toward the fully-closed position (illustrated in FIG. 5), the gripping edge 138a of the third jaw plate 132 will make first contact with the electrical connector 200a. The gripping edge 138a of the third jaw plate 132 exerts a force F on the electrical connector 200a that will urge the electrical connector 200 down toward the longitudinal axis 110 and to the right toward the alignment point 112 (wherein the terms "down" and "right" are used with reference to the view in the Figure). As the jaw assemblies 120 and 130 continue to move in the directions of arrows A and B toward the fully-closed position (illustrated in FIG. 5), the remaining gripping edges 138b, 128a, and 128b will contact the electrical connector 200a, such that each of the gripping edges 128a, 128b, 138a, and 138b exerts a force F on the electrical connector 200a. The forces F all urge the electrical connector 200a toward alignment with the alignment point 112. When the electrical connector 200a is aligned (i.e., centered) with the alignment point 112, the forces F exerted by the gripping edges 128a, 128b, 138a, and 138b are balanced such that the electrical connector 200a does not move.

Referring again to FIGS. 1-5, the jaw assemblies 120 and 130 are movable along the longitudinal axis 110 and relative to the connector support 102 and the pallet base 180 along rails 184 and 186 attached to the first surface 182 of the pallet base 180. Referring primarily to FIG. 3, the first jaw support 140 and the second jaw support 142 include slots 185 and 187 through which the rails 184 and 186 are inserted. The slots 185 and 187 prevent the jaw supports 140 and 142 from being removed from the pallet base 180 and also guide movement of the jaw supports 140 and 142 along the rails 184 and 186. The rails 184 and 186 are aligned with the longitudinal axis 110 such that the movements of the first jaw assembly 120 and the second jaw assembly 130 are along the longitudinal axis 110.

Figure 7A:
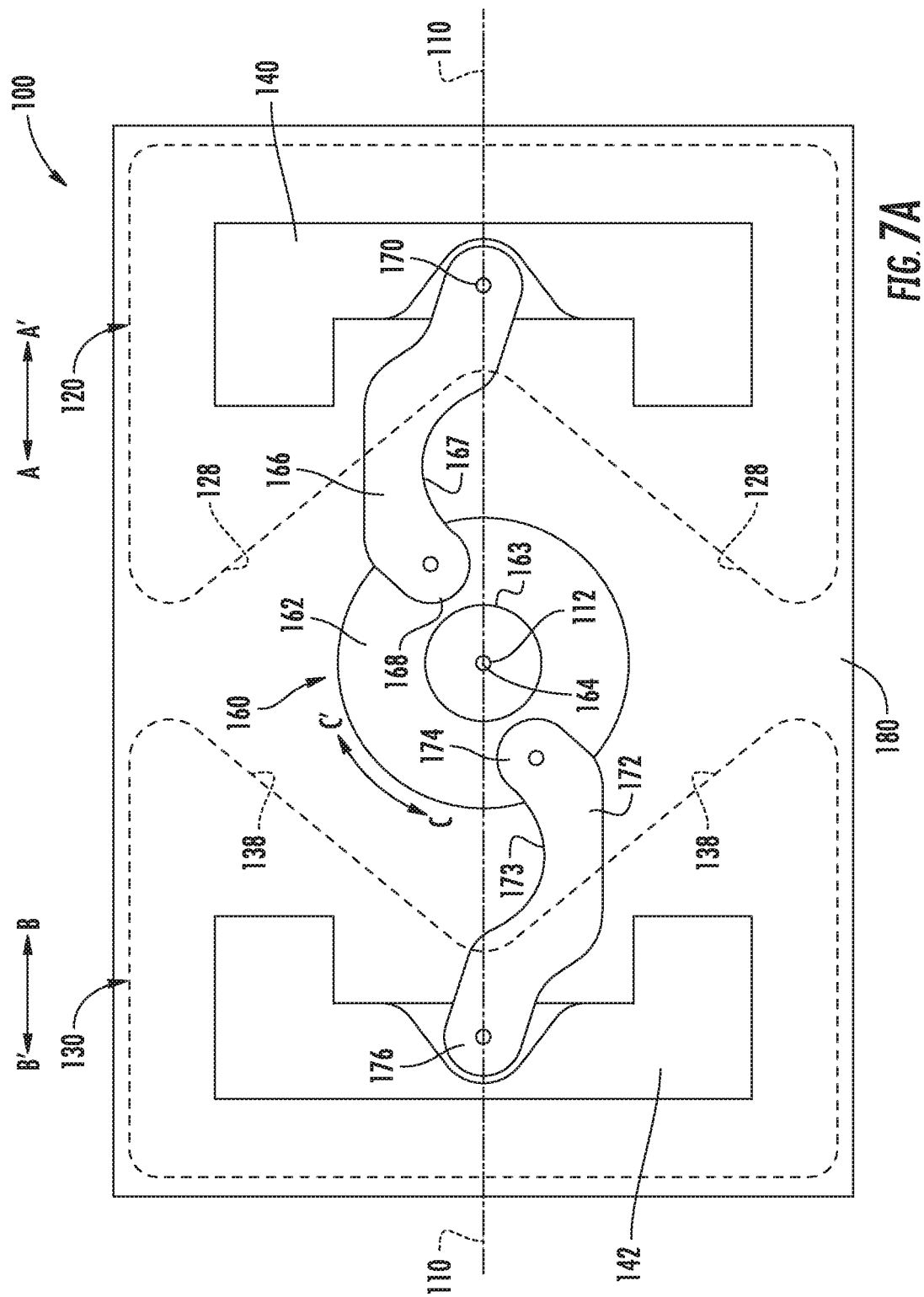
FIG. 7A is a top view of the pallet of FIG. 1, wherein aspects of the pallet are removed from the illustration for clarity to show a synchronization device of the pallet, and wherein the synchronization device is shown in a first position with the jaw assemblies in the open position.

In the various aspects, the first jaw assembly 120 and the second jaw assembly 130 are connected to each other via a synchronization device 160 such that the second jaw assembly 130 moves in the direction of arrow B as the first jaw assembly 120 moves in the direction of arrow A, and such that the second jaw assembly 130 moves in the direction of arrow B' when the first jaw assembly 120 moves in the direction of arrow A'. Additionally, the synchronization device 160 ensures that the first jaw assembly 120 and the second jaw assembly 130 reach the fully closed position in alignment with the alignment point 112. FIGS. 7A and 7B are top views of the pallet 100 of FIGS. 1-5 with certain features removed from view to expose the components of the synchronization device 160 and operation of the same. The synchronization device 160, according to one aspect, includes a circular cam arranged on an opposite side of the connector support 102 from the support surface 108 (as shown most clearly in FIG. 2). An axis of rotation 164 of the circular cam 162 is perpendicular to the longitudinal axis 110 and passes through the alignment point 112. As illustrated in FIGS. 7A and 7B, the axis of rotation 164 is oriented in a direction into and out of the page. The synchronization device 160 includes a first linkage 166 pivotably coupled to the circular cam 162 at a first end 168 and to the first jaw assembly 120 at a second and 170. The second end 170 of the first linkage 166 is coupled to the first jaw support 140 in at least one aspect. The synchronization device 160 includes a second linkage 172 pivotably coupled to the circular cam 162 at a third end 174 and to the second jaw assembly 130 at a fourth and 176. The fourth end 176 of the second linkage 172 is coupled to the second jaw support 142 in at least one aspect.

The first linkage 166 and the second linkage 172 are pivotably coupled to the circular cam 162 180° apart from each other about the axis of rotation 164 of the circular cam 162 to facilitate synchronized motion, meaning that the first jaw assembly 120 and the second jaw assembly 130 are always positioned equidistant from the alignment point 112 along the longitudinal axis 110 and that the first jaw assembly 120 and the second jaw assembly 130 move at equal rates toward or away from the alignment point 112. The circular cam 162 is rotatable about the axis of rotation 164 in the direction of arrows C and C'. As the circular cam 162 rotates in the direction of arrow C from the position shown in FIG. 7A to the position shown in 7B, the second end 170 of the first linkage 166 and the fourth end 176 of the second linkage 172 move along the longitudinal axis 110 in the directions of arrows A and B, respectively, such that motion of the first jaw assembly 120 and the second jaw assembly 130 toward the alignment point 112 is synchronized. Similarly, as the circular cam 162 rotates in the direction of arrow C' from the position shown in FIG. 7B to the position shown in 7A, the second and 170 of the first linkage 166 and the fourth end 176 of the second linkage 172 move along the longitudinal axis 110 in the directions of arrows A' and B', respectively, such that motion of the first jaw assembly 120 and the second jaw assembly 130 away from the alignment point 112 is synchronized.

In at least one aspect, the circular cam 162 is connected to the pallet base 180 by a pivot 163 such that the circular cam 162 rotates about the axis of rotation 164 on the pivot 163. In one aspect, the pivot 163 includes a ball bearing or a bushing to facilitate rotation by minimizing friction. The first linkage 166 may include a first cut out 167 and the second linkage 172 may include a second cutout 173 that provide clearance for the first and second linkages 166 and 172 as the circular cam 162 rotates in the direction of arrow C. As shown in FIG. 7B, the first and second cutouts 167 and 173 provide clearance from the pivot 163 when the first and second linkages 166 and 172 cross over the alignment point 112 about the circular cam 162.

In at least one aspect, the first jaw assembly 120 and the second jaw assembly 130 are also connected to each other by one or more resilient members that urge the first and second jaw assemblies 120 and 130 toward the alignment point 112 there-between. FIG. 2 illustrates a resilient member 144 configured as a spring stretched between the first and second jaw assemblies 120 and 130. In various other aspects, the resilient member 144 could be an elastomeric member (e.g., a rubber band or a bungee cord) that is stretched between the first and second jaw assemblies 120 and 130. The resilient member 144 may be coupled to the first jaw support 140 of the first jaw assembly 120 and the second jaw support 142 of the second jaw assembly 130. In various aspects, the resilient member 144 is oriented along the longitudinal axis 110 and offset from the alignment point 112 such that the resilient member 144 does not cover or obscure the support surface 108 of the connector support 102 as viewed in FIG. 1. In various aspects, the pallet 100 includes a plurality of resilient members 144. For example, in one aspect, the pallet 100 includes two resilient members 144, wherein the resilient members 144 are arranged on opposite sides of the alignment point 112. In another aspect, the pallet 100 includes four resilient members 144, wherein two resilient members 144 are arranged on each side of the alignment point 112, and wherein one resilient member 144 on each side is arranged above the remaining resilient member 144 on that side.

Figure 4:
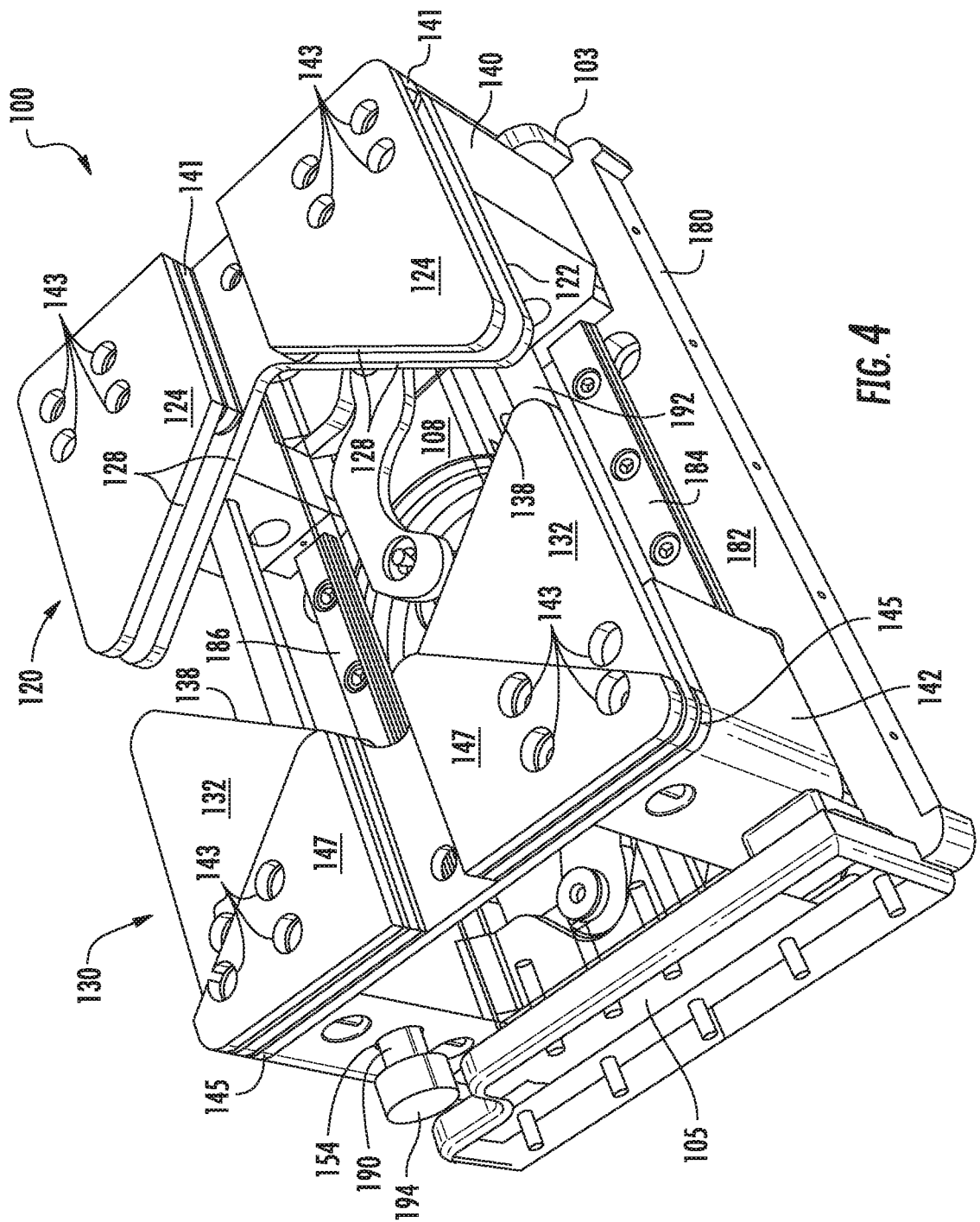
FIG. 4 is a perspective view of the pallet of FIG. 1.

In at least one aspect, the pallet 100 includes a first pushrod 190 attached to the first jaw support 140 and a second pushrod 192 attached to the second jaw support 142. Referring primarily to FIG. 4, the first pushrod 190 extends from the first jaw support 140 in a direction toward the second jaw support 142 along the longitudinal axis 110. Similarly, the second pushrod 192 extends from the second jaw support 142 in a direction toward the first jaw support 140 along the longitudinal axis 110. In at least one aspect, the first jaw support 140 includes a first aperture 152 (shown in broken line in FIG. 2) and the second jaw support 142 includes a second aperture 154 (shown in FIG. 4). The first aperture 152 is oriented along the longitudinal axis 110 such that the second pushrod 192 extending from the second jaw support 142 extends through the first aperture 152. The second aperture 154 is also oriented along the longitudinal axis 110 such that the first pushrod 190 extending from the first jaw support 140 extends through the second aperture 154.

Figure 9:
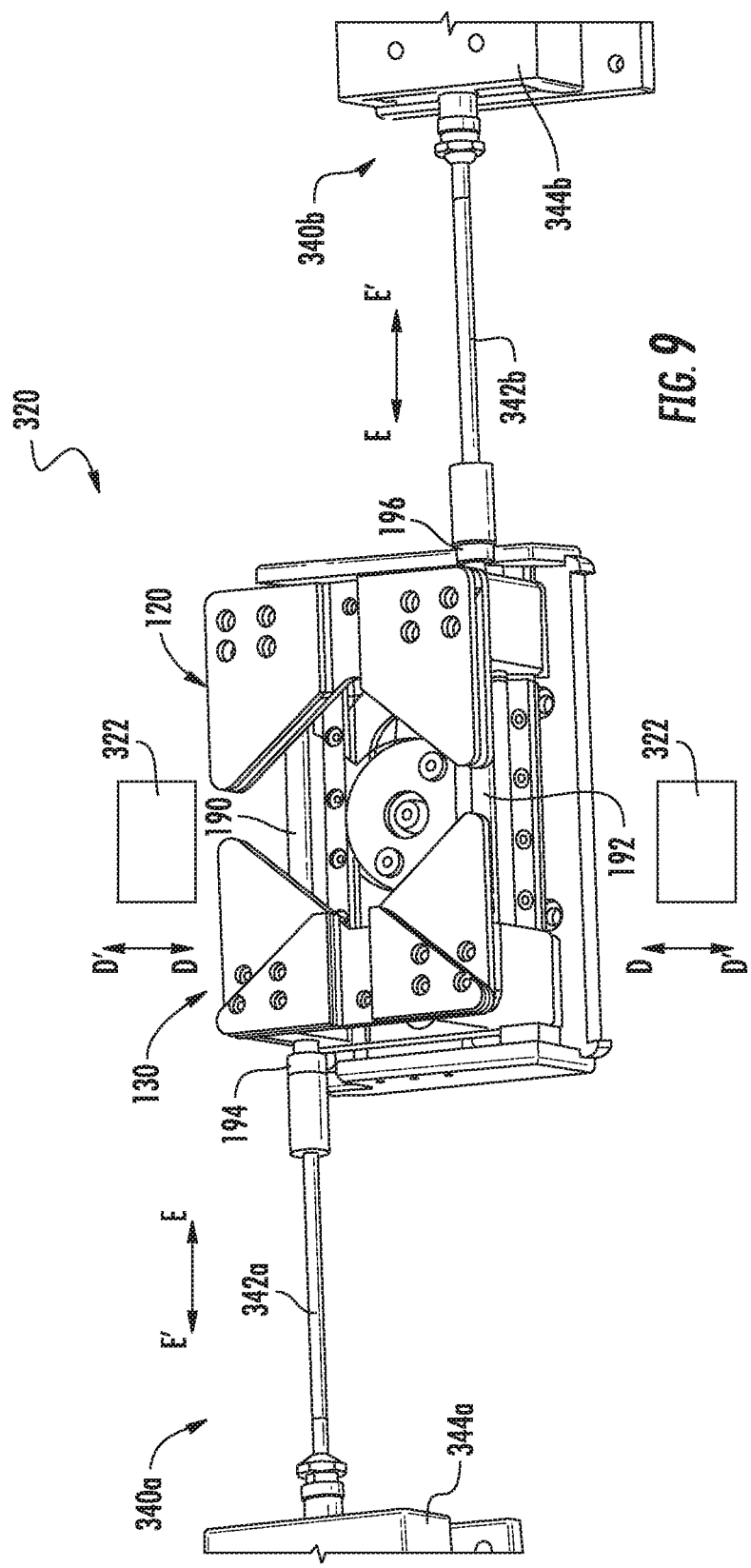
FIG. 9 is a perspective view of actuators configured to move the jaw assemblies of the pallet of FIG. 1 from a closed position to the open position.

The first pushrod 190 includes a free, blunt end 194 configured to receive actuation forces from an actuator (discussed below with reference to FIG. 9). The second pushrod 192 also includes a free, blunt end 196 configured to receive actuation forces from an actuator. Referring primarily to FIG. 5, in aspects that include the resilient member(s) 144, the first jaw assembly 120 and the second jaw assembly 130 are biased toward the closed position. When actuation forces are applied to the free, blunt ends 194 and 196, the first jaw assembly 120 and the second jaw assembly 130 are pushed away from each other toward the open position illustrated in FIG. 4. As discussed above, the synchronization device 160 ensures that the first jaw assembly 120 and the second jaw assembly 130 move in a coordinated manner.

Figure 8:
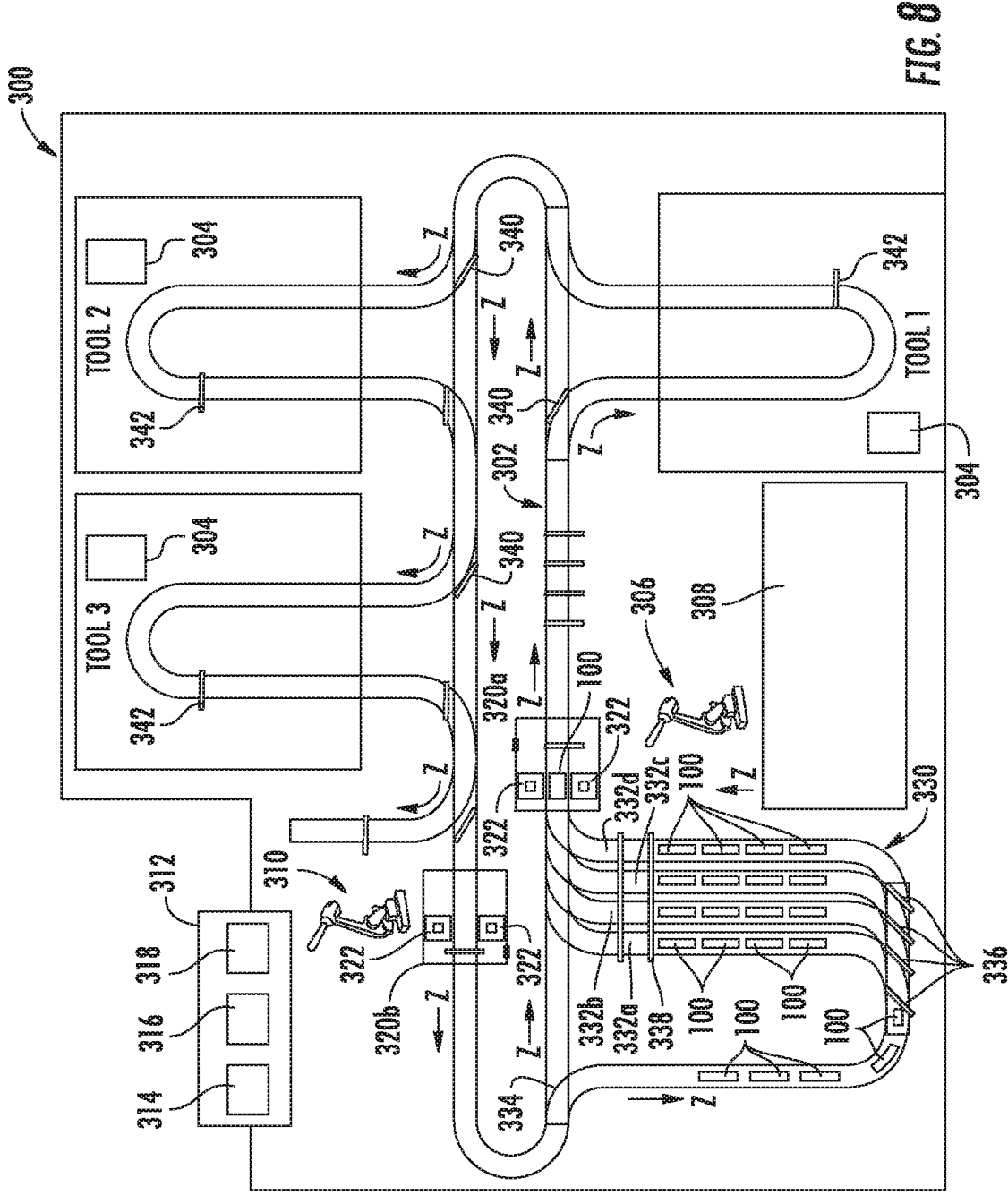
FIG. 8 is a top view of a manufacturing system that includes a conveyor for moving the pallets of FIG. 1, robots operable to load or offload electrical connectors onto and off of the pallets, and robots operable to install plugs into electrical connectors.

FIG. 8 is a top, schematic view of one aspect of a manufacturing system 300 for electrical connectors, such as the electrical connectors 200a and 200b illustrated in FIGS. 6A and 6B. The manufacturing system 300 includes a conveyor 302, which is operable to transport respective ones of a plurality of pallets 100 to one or more robots 304 operable to plug connector sockets 202 of the electrical connectors 200. The direction of movement of pallets 100 along the conveyor 302 is indicated by arrows Z. The conveyor 302 could include a single conveyor belt or a plurality of conveyor belts that transfer the pallets 100 from one to the next. In the aspect shown in FIG. 8, the manufacturing system 300 includes three robots 304. Other aspects could include fewer than three robots 304 or more than three robots 304. The manufacturing system 300 includes a staging area 330 in which pallets 100 are staged while waiting to transport an electrical connector 200 to one of the robots 304. In aspects in which the manufacturing system 300 is set up for multiple, different types of pallets, the staging area 330 may include a plurality of lanes 332a, 332b, 332c, and 332d into which the different types of pallets are sorted. The conveyor 302 includes a gate 334 that selectively opens or closes to direct pallets 100 into the staging area 330. The conveyor 302 also includes gates 336 that selectively open or close to direct pallets 100 into particular ones of the plurality of lanes 332a, 332b, 332c, and 332d. The conveyor 302 also includes gates 338 that selectively open or close to release pallets 100 from particular ones of the plurality of lanes 332a, 332b, 332c, and 332d. In the aspects described herein in which the pallets 100 are the same, any of the pallets 100 can be staged in any of the plurality of lanes 332a, 332b, 332c, and 332d. In aspects in which the manufacturing system 300 is set up for use with the pallets 100 in the aspects described herein, the plurality of lanes 332a, 332b, 332c, and 332d could be eliminated in favor of a single lane, thereby simplifying the manufacturing system 300.

To place an electrical connector 200 onto a pallet 100, the manufacturing system 300 releases a pallet 100 from the staging area 330. The released pallet 100 travels along the conveyor 302 and enters a loading area 320a that includes clamps 322, which are operable to grip sides of the pallet 100. FIG. 9 illustrates the clamps 322 along sides of the pallet 100. The clamps are moved in the direction of arrows D to grip sides of the pallet 100 and are moved in the direction of arrows D' to release the pallet 100. Still referring to FIG. 9, the loading area 320a includes a first actuator 340a configured to contact the free, blunt end 194 of the first pushrod 190. The loading area 320a also includes a second actuator 340b configured to contact the free, blunt end 196 of the second pushrod 192. In the aspect illustrated in FIG. 9, the first actuator 340a includes a first solenoid 344a coupled to a first actuator link 342a, wherein the first actuator link 342a contacts the free, blunt end 194 of the first pushrod 190. The second actuator 340b includes a solenoid 344b coupled to a second actuator link 342b, wherein the second actuator link 342b contacts the free, blunt end 196 of the second pushrod 192. Actuation of the solenoids 344a and 344b move the actuator links 342a and 342b in the direction of arrows E, thereby applying actuation forces to the first and second pushrods 190 and 192, respectively. Deactivation of the solenoids 344a and 344b move the actuator links 342a and 342b in the direction of arrows E', thereby removing the actuation forces from the first and second pushrods 190 and 192, respectively. In various aspects, the solenoids 344a and 344b could be replaced with other actuation mechanisms, such as pneumatic or hydraulic actuators.

Returning to FIG. 8, after a pallet 100 has been gripped by the clamps 322 and the actuators 340a and 340b apply the actuation forces to the first and second pushrods 190 and 192, respectively, of the pallets 100 in the loading area 320a, a loading robot 306 can place an electrical connector 200 on the pallet 100. The loading robot 306 picks up an electrical connector from a staging area 308. The staging area 308 may include several different types and/or sizes of electrical connectors. The loading robot 306 typically is equipped with a machine vision system (e.g., a digital camera) such that the loading robot 306 can determine the position and orientation of the electrical connectors in the staging area 308. The loading robot 306 can pick up an electrical connector 200, transport the electrical connector 200 to the pallet 100, and place the electrical connector 200 on the pallet 100 in a particular orientation (i.e., rotated or clocked) relative to the pallet 100. Thereafter, the first and second actuators remove the actuation forces from the first and second pushrods 190 and 192, respectively. As discussed above, with the actuation forces removed, the first and second jaw assemblies 120 and 130 move toward the electrical connector 200 such that the gripping edges 128 and 138 of the first and second jaw assemblies 120 and 130, respectively, grip the electrical connector. In the event the loading robot 306 places the electrical connector 200 on the pallet 100 out of alignment with the alignment point 112, the gripping edges 128 and 138 of the first and second jaw assemblies 120 and 130, respectively, urge the electrical connector 200 into alignment with the alignment point 112.

After the electrical connector 200 is positioned on the pallet 100 and gripped by the gripping edges 128 and 138 of the first and second jaw assemblies 120 and 130, the clamps 322 in the loading area 320a release the pallet 100 such that the pallet 100 is transported along the conveyor 302 in the direction of arrows Z. Thereafter, the manufacturing system 300 selectively directs the pallet 100 along the conveyor 302 to one of the robots 304, which are operable to plug connector sockets 202 of the electrical connector 200 using gates 340. Additional gates 342 can stop the pallet 100 proximate to the one of the robots 304 so that the selected robot can install plugs in the connector sockets 202 of the electrical connector 200. In various aspects, the robots 304 can perform additional and/or different functions than installing plugs in connector sockets 202 of the electrical connector 200. For example, in at least one aspect, one or more of the robots could install electrical wires of the wire bundle and/or a wiring harness into connector sockets 202 of the electrical connector 200.

After the robot 304 has performed the designated operations on the electrical connector 200, the gate 342 releases the pallet 100, and the pallet 100 travels to an unloading area 320b. In the unloading area 302b, a second set of clamps 322 grips the pallet 100 and second actuators 340a and 340b associated with the unloading area 320b apply the actuation forces to the first and second pushrods 190 and 192, respectively, to move the jaw assemblies 120 and 130 to the open position. Thereafter, an unloading robot 310 removes the electrical connector 200 from the pallet 100. The unloading robot 310 places the removed electrical connector 200 in an unloading area 312. The unloading area 312 can include a plurality of different bins or other separated areas for storing different types of completed electrical connectors 200. In the aspect illustrated in FIG. 8, the unloading area 312 includes a first bin 314, a second bin 316, and a third bin 318. In various other aspects, the unloading area 312 could include more or fewer than three bins. After the unloading robot 310 has removed the electrical connector 200, the actuators 340a and 340b remove the actuating forces from the first and second pushrods 190 and 192, respectively, and the clamps 322 to release the pallet 100. Thereafter, the pallet 100 travels along the conveyor in the direction of arrow Z to return to the staging area 330. The pallet 100 is then ready for a new electrical connector 200 to be placed thereon for processing by one of the robots 304. The new electrical connector 200 may be of the same size or a different size as the previous electrical connector.

In the aspects described above, the pallet 100 is capable of gripping and transporting a wide range of different electrical connector types and/or sizes. As a result, a single type of pallet 100 may be used with respect to a manufacturing system 300. The use of a single type of pallet 100 can simplify the architecture and operation of the manufacturing system 300. For example, as discussed above, in an application in which the pallets 100 are identical to one another, there is no need for separate lanes (e.g., lanes 332a, 332b, 332c, and 332d) to stage different types of pallets that are specific to different types and/or sizes of electrical connectors 200. As another example, even in circumstances in which a manufacturing system 300 includes separate lanes for different pallets for different sizes and/or types of electrical connectors 200, it may not be possible to include pallets for every type and/or size of electrical connector on the staging area 330 of the conveyor 302 at the same time. As a result, it may be necessary to exchange certain pallets for other types of pallets to accommodate the many different types and/or sizes of electrical connectors. By contrast, using a single type of pallet 100 eliminates or reduces the likelihood that the manufacturing system 300 would have to be shut down to exchange pallets.

In the above described aspects, a single pallet 100 accommodates a number of different types and/or sizes of electrical connectors. In various scenarios, it may be necessary to have certain variations to the pallet 100. For example, different types of electrical connectors may have different heights such that a distance of the jaw plates 122, 124, and 132 from the support surface 108 of the connector support 102 of the pallet 100 may need to change to accommodate them. In at least one example, the jaw supports 140 and 142 may be adjustable to vary the distance of the jaw plates 122, 124, and 132 from the connector support 102 to accommodate electrical connectors 200 having different heights. Alternatively, the manufacturing system 300 could include a limited number of variations of the pallet 100, wherein each of the different variations includes a different distance of the jaw plates 122, 124, and 132 from the connector support 102. In such instances, the number of variations of the pallet 100 is likely far fewer than the number of pallets that are required when each pallet is specific to a particular type and/or size of electrical connector, thereby still providing significant operating flexibility for the manufacturing system 300.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects, other and further aspects described herein may be devised without departing from the basic scope thereof, and the scope thereof is determined by the claims that follow.

What is claimed is:

1. A pallet for transporting electrical connectors, the pallet comprising:
   a connector support that includes a first end and a second end opposed to the first end, wherein the connector support includes a support surface between the first end and the second end, wherein the connector support defines a longitudinal axis between the first end, the second end, and an alignment point between the first end and the second end;

a first jaw assembly arranged over the support surface and bi-directionally movable along the longitudinal axis between the first end and the alignment point, the first jaw assembly comprising:
  a first jaw plate and a second jaw plate arranged over the support surface of the connector support; wherein the first jaw plate and the second jaw plate are in a parallel spaced-apart relationship with respect to each other so as to form a gap; wherein the first and second jaw plates define a first gripping edge;
a second jaw assembly arranged over the support surface and bi-directionally movable along the longitudinal axis between the second end and the alignment point, the second jaw assembly comprising a third jaw plate arranged over the support surface of the connector support and in parallel relation relative to the first and second jaw plates, wherein the third jaw plate defines a second gripping edge; and wherein the third jaw plate is disposed on a plane of the gap so that the third jaw plate is inserted into the gap when the first jaw assembly and the second jaw assembly are moved toward each other into a closed position;
wherein the first gripping edge and the second gripping edge are in an opposing facing relationship with the alignment point disposed between the first and second gripping edges; and wherein the first gripping edge and the second gripping edge form a contoured opening centered on the alignment point; and wherein the contoured opening becomes increasingly smaller in a first dimension along the longitudinal axis and a second dimension transverse to the longitudinal axis as the first jaw assembly and the second jaw assembly are moved into the closed position; and
a synchronization device connected to the first jaw assembly and the second jaw assembly, wherein the synchronization device is operable to synchronize motion of the first jaw assembly and the second jaw assembly from the first and second ends respectively, toward the alignment point.

2. The pallet of claim 1, wherein the synchronization device comprises:
  a circular cam arranged on an opposite side of the connector support from the support surface, wherein an axis of rotation of the circular cam is perpendicular to the longitudinal axis and passes through the alignment point;
  a first linkage pivotably coupled to the circular cam at a first location on the circular cam at a first end of the first linkage and to the first jaw assembly at a second end of the first linkage; and
  a second linkage pivotably coupled to the circular cam at a third end of the second linkage and to the second jaw assembly at a fourth end of the second linkage, wherein rotation of the circular cam about the axis of rotation moves the second end of the first linkage and the fourth end of the second linkage along the longitudinal axis and thereby synchronizes motion of the first and second jaw assemblies attached to the second and fourth ends of the first and second linkages, respectively.

3. The pallet of claim 2, further comprising:
a pallet base arranged on the opposite side of the connector support such that the circular cam is arranged between the pallet base and the connector support, wherein the pallet base includes a first surface facing the opposite side of the connector support; and
first and second rails arranged on the first surface on the pallet base along the longitudinal axis, wherein the first and second jaw assemblies are coupled to the first and second rails such that the first and second rails guide the first and second jaw assemblies along the longitudinal axis.

4. The pallet of claim 3, wherein the circular cam is connected to the pallet base by a pivot, and wherein the circular cam rotates about the axis of rotation on the pivot.

5. The pallet of claim 3, wherein the first jaw assembly further comprises a first jaw support, wherein the first jaw support is slidably coupled to the first and second rails, wherein the first linkage is pivotably coupled to the first jaw support, and wherein the first and second jaw plates are connected to the first jaw support; and
wherein the second jaw assembly further comprises a second jaw support, wherein the second jaw support is slidably coupled to the first and second rails, wherein the second linkage is pivotably coupled to the second jaw support, and wherein the third jaw plate is connected to the second jaw support.

6. The pallet of claim 5, further comprising a resilient member connected to the first jaw support and to the second jaw support, wherein the resilient member exerts a biasing force on the first and second jaw supports that urge the first and second jaw supports toward the alignment point.

7. The pallet of claim 6, further comprising:
  a first pushrod extending from the first jaw support in a direction toward the second jaw support along the longitudinal axis; and
  a second pushrod extending from the second jaw support in a direction toward the first jaw support along the longitudinal axis, wherein the first and second pushrods include free, blunt ends configured to receive actuation forces from actuators, and wherein the actuation forces applied to the first and second pushrods urge the first and second jaw supports toward the first and second ends of the connector support.

8. The pallet of claim 7, wherein the first jaw support includes a first aperture through the first jaw support that is oriented along the longitudinal axis, wherein the second jaw support includes a second aperture through the second jaw support that is oriented along the longitudinal axis, wherein the first pushrod extends through the second aperture, and wherein the second pushrod extends through the first aperture.

9. A manufacturing system for electrical connectors, wherein at least two of the electrical connectors differ in size, the manufacturing system comprising:
  a plurality of pallets, each of the respective pallets comprising:
    a connector support that includes a first end and a second end opposed to the first end, wherein the connector support includes a support surface between the first end and the second end, wherein the connector support defines a longitudinal axis between the first end, the second end, and an alignment point between the first end and the second end;
    a first jaw assembly arranged over the support surface and bi-directionally movable along the longitudinal axis between the first end and the alignment point, the first jaw assembly comprising:
      a first jaw plate and a second jaw plate arranged over the support surface of the connector support; wherein the first jaw plate and the second jaw plate are in a parallel spaced-apart relationship with respect to each other so as to form a gap; wherein the first and second jaw plates define a first gripping edge;

a second jaw assembly arranged over the support surface and bi-directionally movable along the longitudinal axis between the second end and the alignment point, the second jaw assembly comprising a third jaw plate arranged over the support surface of the connector support and in parallel relation relative to the first and second jaw plates, wherein the third jaw plate defines a second gripping edge; and wherein the third jaw plate is disposed on a plane of the gap so that the third jaw plate is inserted into the gap when the first jaw assembly and the second jaw assembly are moved toward each other into a closed position;

wherein the first gripping edge and the second gripping edge are in an opposing facing relationship with the alignment point disposed between the first and second gripping edges; and wherein the first gripping edge and the second gripping edge form a contoured opening centered on the alignment point; and wherein the contoured opening becomes increasingly smaller in a first dimension along the longitudinal axis and a second dimension transverse to the longitudinal axis as the first jaw assembly and the second jaw assembly are moved into the closed position; and a synchronization device connected to the first jaw assembly and the second jaw assembly, wherein the synchronization device is operable to synchronize motion of the first jaw assembly and the second jaw assembly from the first and second ends respectively, toward the alignment point;

at least one robot operable to plug connector sockets of electrical connectors with plugs; and a conveyor operable to transport respective ones of the plurality of pallets to the at least one robot.

10. The manufacturing system of claim 9, wherein the synchronization device comprises:

a circular cam arranged on an opposite side of the connector support from the support surface, wherein an axis of rotation of the circular cam is perpendicular to the longitudinal axis and passes through the alignment point;

a first linkage pivotably coupled to the circular cam at a first location on the circular cam at a first end of the first linkage and to the first jaw assembly at a second end of the first linkage; and a second linkage pivotably coupled to the circular cam at a third end of the second linkage and to the second jaw assembly at a fourth end of the second linkage, wherein rotation of the circular cam about the axis of rotation moves the second end of the first linkage and the fourth end of the second linkage along the longitudinal axis and thereby synchronizes motion of the first and second jaw assemblies attached to the second and fourth ends of the first and second linkages, respectively.

11. The manufacturing system of claim 10, wherein the pallets further comprise:

a pallet base arranged on the opposite side of the connector support such that the circular cam is arranged between the pallet base and the connector support, wherein the pallet base includes a first surface facing the opposite side of the connector support; and first and second rails arranged on the first surface on the pallet base along the longitudinal axis, wherein the first and second jaw assemblies are coupled to the first and second rails such that the first and second rails guide the first and second jaw assemblies along the longitudinal axis.

12. The manufacturing system of claim 11, wherein the pallets further comprise:

wherein the circular cam is connected to the pallet base by a pivot, and wherein the circular cam rotates about the axis of rotation on the pivot.

13. The manufacturing system of claim 11, wherein the first jaw assembly of respective ones of the plurality of pallets further comprises a first jaw support, wherein the first jaw support is slidably coupled to the first and second rails, wherein the first linkage is pivotably coupled to the first jaw support, and wherein the first and second jaw plates are connected to the first jaw support; and wherein the first jaw assembly of respective ones of the plurality of pallets further comprises a second jaw support, wherein the second jaw support is slidably coupled to the first and second rails, wherein the second linkage is pivotably coupled to the second jaw support, and wherein the third jaw plate is connected to the second jaw support.

14. The manufacturing system of claim 13, wherein each of the pallets further comprise a resilient member connected to the first jaw support and to the second jaw support, wherein the resilient member exerts a biasing force on the first and second jaw supports that urge the first and second jaw supports toward the alignment point.

15. The manufacturing system of claim 14, wherein:

each of the pallets further comprise:

a first pushrod extending from the first jaw support in a direction toward the second jaw support along the longitudinal axis; and a second pushrod extending from the second jaw support in a direction toward the first jaw support along the longitudinal axis, wherein the first and second pushrods include free, blunt ends configured to receive actuation forces, and wherein the actuation forces applied to the first and second pushrods urge the first and second jaw supports toward the first and second ends of the connector support; and the conveyor comprises a first actuator configured to contact the free, blunt end of the first pushrod and a second actuator configured to engage the free, blunt end of the second pushrod, wherein the first and second actuators are operable to apply the actuation forces to the first and second pushrods, respectively.

16. The manufacturing system of claim 15, wherein the conveyor further comprises clamps operable to grip each of the respective pallets in a stationary relationship with respect to the first and second actuators.

17. The manufacturing system of claim 16, further comprising a loading robot operable to place electrical connectors on respective ones of the plurality of pallets on the conveyor when the respective ones of the plurality of pallets are gripped by the clamps, and wherein the conveyor includes a single pallet queue upstream of the clamps.

18. The manufacturing system of claim 15, wherein the first jaw support of each of the pallets includes a first aperture through the first jaw support that is oriented along the longitudinal axis, wherein the second jaw support of the pallets includes a second aperture through the second jaw support that is oriented along the longitudinal axis, wherein the first pushrod of the pallets extends through the second aperture, and wherein the second pushrod of the pallets extends through the first aperture.

19. The manufacturing system of claim 9, wherein respective ones of the plurality of pallets are identical to remaining ones of the plurality of pallets.

20. A method of plugging electrical connectors, comprising:
- providing a pallet, comprising:
  - a connector support that includes a first end and a second end opposed to the first end, wherein the connector support includes a support surface between the first end and the second end, wherein the connector support defines a longitudinal axis between the first end, the second end, and an alignment point between the first end and the second end;
  - a first jaw assembly arranged over the support surface and bi-directionally movable along the longitudinal axis between the first end and the alignment point, the first jaw assembly comprising:
    - a first jaw plate and a second jaw plate arranged over the support surface of the connector support; wherein the first jaw plate and the second jaw plate are in a parallel spaced-apart relationship with respect to each other so as to form a gap; wherein the first and second jaw plates define a first gripping edge;
  - a second jaw assembly arranged over the support surface and bi-directionally movable along the longitudinal axis between the second end and the alignment point, the second jaw assembly comprising a third jaw plate arranged over the support surface of the connector support and in parallel relation relative to the first and second jaw plates, wherein the third jaw plate defines a second gripping edge; and wherein the third jaw plate is disposed on a plane of the gap so that the third jaw plate is inserted into the gap when the first jaw assembly and the second jaw assembly are moved toward each other into a closed position;
  - wherein the first gripping edge and the second gripping edge are in an opposing facing relationship with the alignment point disposed between the first and second gripping edges; and wherein the first gripping edge and the second gripping edge form a contoured opening centered on the alignment point; and wherein the contoured opening becomes increasingly smaller in a first dimension along the longitudinal axis and a second dimension transverse to the longitudinal axis as the first jaw assembly and the second jaw assembly are moved into the closed position; and
  - a synchronization device connected to the first jaw assembly and the second jaw assembly, wherein the synchronization device is operable to synchronize motion of the first jaw assembly and the second jaw assembly from the [respective] first and second ends respectively, toward the alignment point;
- moving the first and second jaw assemblies of the pallet toward the first and second ends, placing a first electrical connector on the support surface of the pallet, and moving the first and second jaw assemblies toward the alignment point such that the first and second gripping edges contact external surfaces of the first electrical connector;
- transporting the pallet to a robot;
- operating the robot to plug at least one connector socket on the first electrical connector;
- transporting the pallet with the plugged at least one connector socket on the first electrical connector to an unloading station;
- moving the first and second jaw assemblies of the pallet toward the first and second ends of the connector support and removing the first electrical connector on the support surface of the pallet;
- placing a second electrical connector on the support surface of the pallet and moving the first and second jaw assemblies toward the alignment point such that the first and second gripping edges contact external surfaces of the second electrical connector, wherein the external surfaces of the second electrical connector have a different external dimension than the first electrical connector;
- transporting the pallet and the second electrical connector to the robot;
- operating the robot to plug at least one connector socket on the second electrical connector; and
- transporting the pallet with the plugged at least one connector socket on the second electrical connector to the unloading station.

\* \* \* \* \*

UNITED STATES PATENT AND TRADEMARK OFFICE
CERTIFICATE OF CORRECTION

PATENT NO. : 10,404,027 B2
APPLICATION NO. : 15/372656
DATED : September 3, 2019
INVENTOR(S) : John R. Porter Page 1 of 1

It is certified that error appears in the above-identified patent and that said Letters Patent is hereby corrected as shown below:

In the Claims

In Column 18, Line 7, in Claim 20, after "from the" delete "[respective]".

Signed and Sealed this
Nineteenth Day of November, 2019

Andrei Iancu
*Director of the United States Patent and Trademark Office*